United States Patent [19]
Empie et al.

[11] Patent Number: 5,030,099
[45] Date of Patent: Jul. 9, 1991

[54] WINDSURFER RIG TRAINING AID AND PROTECTIVE SUPPORT FOR THE RIG UNIVERSAL JOINT

[76] Inventors: John E. Empie, Box 166, RD #2, Troy, N.Y. 12182; Robert L. Grant, 12 S. Lake Dr., Troy, N.Y. 12180

[21] Appl. No.: 443,442

[22] Filed: Nov. 30, 1989

[51] Int. Cl.$^5$ .................. G09B 9/06; G09B 19/16
[52] U.S. Cl. ............................ 434/60; 434/247; 434/392; 272/93
[58] Field of Search ............ 434/60, 247, 392; 272/1 B, 93, 97, 146

[56] References Cited

U.S. PATENT DOCUMENTS

| | | | |
|---|---|---|---|
| 4,021,934 | 5/1977 | Taylor | 434/60 |
| 4,436,513 | 3/1984 | Darby | 434/60 |
| 4,449,940 | 5/1984 | Berger | 434/60 |
| 4,595,366 | 6/1986 | Berger | 434/60 |

FOREIGN PATENT DOCUMENTS 3300547 8/1983 Fed. Rep. of Germany ........ 434/60
2496472 6/1982 France ..................... 272/1 B Primary Examiner—Richard J. Apley
Assistant Examiner—Joe H. Cheng
Attorney, Agent, or Firm—Joseph V. Claeys

[57] ABSTRACT

There is disclosed a new teaching aid and support device for use with a windsurfer rig, which rig usually includes a mast, a boom, a sail, and a universal joint. The teaching aid and support device comprises a stationary base member for supporting the windsurfer rig. The stationary base member is in the form of a shallow, inverted receptacle having a top planar surface and depending side walls which are arranged and constructed so that when the bottom edges of the sidewalls of the base member are placed on the ground the base member is securely and non-rotatably supported from the ground. The top planar surface of the base member has a suitable mast receiver opening whose vertical center line is near the geometrical center of the base member. The device also includes an arrangement for securing the mast to the base member.

35 Claims, 3 Drawing Sheets

WINDSURFER RIG TRAINING AID AND PROTECTIVE SUPPORT FOR THE RIG UNIVERSAL JOINT

BACKGROUND OF THE INVENTION

1. Field of the Invention

The present invention relates to a windsurfer training device, and more particularly to a simple, inexpensive, portable, and safe training aid and step-mast universal joint support for a windsurfer rig, whereby an individual may be taught and can practice, on land and without damage to the mast-step universal joint, the proper manipulation of the rig, and may safely practice the basic and advanced rig manuevers and develop the rig handling skills associated with actual windsurfer board sailing while standing on the ground and before going on the water. The device may also be used as a simple and convenient rigging aid for properly trimming and setting the assembly.

A windsurfer comprises a sailboard and a rig which is adapted to be attached to the sailboard. Typically, the rig includes a mast having a mast-step and universal joint, a boom, and a sail. The term "rig" will be used for convenience hereafter from time to time in the description and in the claims and refers to the assembly which is adapted for connection to the sailing board and which typically includes the mast, the mast-step and universal joint, the boom, and the sail.

In windsurfer sailing the user stands atop the sailboard and steering and control is accomplished by specific maneuvers of the rig. The user holds the boom, which generally is a forked or "wishbone" boom, and obtains a ride by properly pivoting and otherwise moving the rig. Until such time as the user can master the necessary basic movements of the rig, however, the user will not be able to sail and is bound to fall into the water often. Not only is climbing back onto the board and pulling up the rig time after time not very enjoyable, but it can be exhausting as well It was early recognized that it would be desirable to provide for an "on the land" training aid whereby much of the difficulty encountered by the novice in learning to sail a windsurfer could be avoided and such novice sailor could learn the basic sailing requirements before venturing on the water.

2. DESCRIPTION OF THE PRIOR ART

Attempts have been made in the prior art to achieve these desiderata by means of windsurfer simulators. For example, windsurfer simulator training devices are known which attempt to simulate all of the actions of the windsurfer rig and board and other conditions expected to be encountered during actual windsurfer board sailing. It was expected that such devices could hopefully be used to provide a device to teach a novice sailor all of the necessary skills relating to the use of a windsurfer board before actual use of the board on the water. Numerous prior art windsurfer simulators are known, some examples of which are shown in U.S. Pats. Nos. 4,021,934, and 4,449,940. Typically, such simulator devices consist of some type of foundation or base arrangement upon which a sail board, a section of a sailboard, a platform, or the like is secured and arranged for rotation with respect to such foundation or base. The sailboard, or other platform, may also be arranged to pivot or rock and/or otherwise simulate the various board movements to which one is subjected when actually sailing on the water. Such prior art simulator are bulky, costly, and complex and have otherwise not been entirely satisfactory, and have thus had limited practical use by individual sailors. Further, some of such prior art simulator devices have the potential of causing injuries to the user. In U.S. Pat. No. 4,436,513 there is shown a simulator device which attempts to overcome some of the disadvantages and unsafe conditions of the foregoing prior art simulators by employing a lower to the ground platform which is supported by and rotates about a base member. Because of its lower to the ground construction the simulator of U.S. Pat. No. 4,436,513 appears to provide a safer simulator on which to instruct beginners, however, it is still not entirely satisfactory since it is complex, not easily transportable, is not inexpensive, and still employs a platform or deck arranged to be rotatable with respect to a base member.

Accordingly, there remains a continuing need for a safe, simple, inexpensive, and truly portable windsurfer training and rigging device.

SUMMARY OF THE INVENTION

It is an object of this invention to provide an easily portable, safe, effective and inexpensive windsurfer training device which allows the user to learn and practice all of the required and desired rig manuevers while standing on the ground.

It is another object of the present invention to provide a portable, safe, simple, and inexpensive device which serves both to provide protection for the expensive universal joint of the mast-step section of a windsurfer rig and an "on the land" training aid to teach the novice sailor the basic maneuvering of the rig, which is a desirable and necessary requirement for the beginner. The device may also be used by the more experienced sailor to develop and improve the more advanced sailing skills.

Briefly stated, in accordance with one aspect of the present invention, there is provided a new and improved training aid and support device for a windsurfer rig, which in its most general form comprises a planar deck member having a rig-mast receiving means thereon, means for securing the rig-mast to the deck member, and means depending from the underside of the planar deck member for stably supporting the deck member from and a small distance above a supporting surface, such as the ground. Preferably, the supporting means is arranged in a configuration to provide for at least one acutely-angled vertex and a geometric center near the vertical centerline of the rig-mast receiving means. Preferably, the supporting means is arranged to have a generally trangular configuration. The device further includes means for securing the rig-mast to the planar deck member.

In another preferred embodiment the windsurfer rig training aid and support device of this invention comprises a base member in the form of an inverted shallow, triangular receptical defined by a top planar surface and three side rails depending from the top planar surface for supporting the base member from a supporting surface, such as the ground. A rig-mast receiving means is provided at the top planar surface and is arranged and constructed to receive and support the rig-mast near the geometric center of the hollow triangular base member. The device also includes means for securing the rig-mast to the base member.

To allow for the broadest range of application from a single model, the rig-mast receiving means can be arranged and constructed so as to be capable of receiving various different sizes, types and styles of masts. In one preferred embodiment the rig-mast receiving means comprises spaced-apart openings of different diameters interconnected by a lateral open slot. That is, the opening has a sort of unsymmetrical dumbell shape. The center of the slot of the dumbell shaped opening is near the geometric center of the triangular base member so that the rig-mast may be disposed in a selected size opening and will be received and supported in such opening and near the geometric center of the triangular base member. Such a dumbell shaped rig-mast receiving means wherein the openings are appropriately sized is capable of receiving and supporting the types of windsurfer masts which are presently most widely used.

DESCRIPTION OF THE PREFERRED EMBODIMENTS

Figure 1:
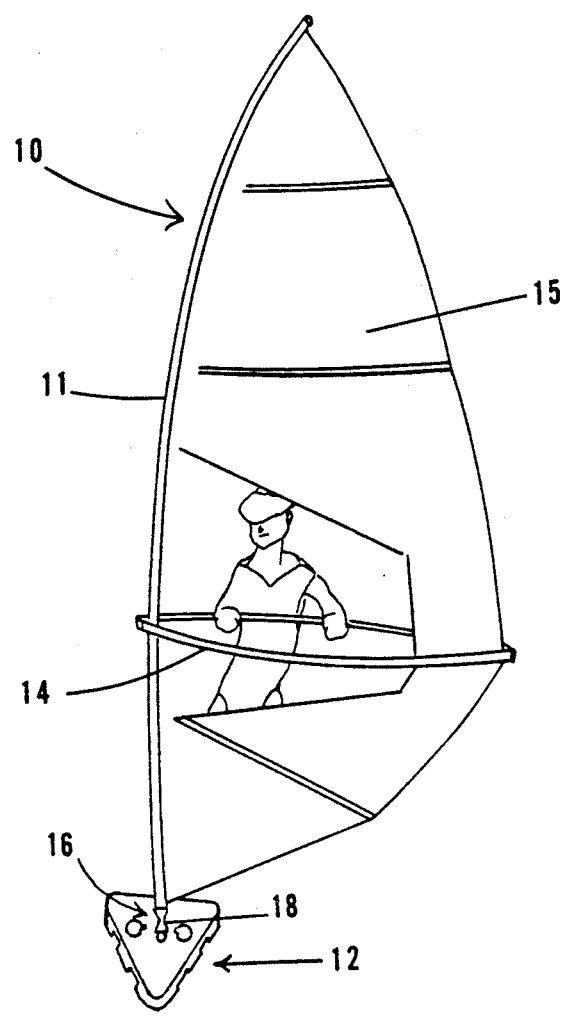
FIG. 1 is a perspective view of the training aid and rig support device in accordance with this invention in use.
Figure 2:
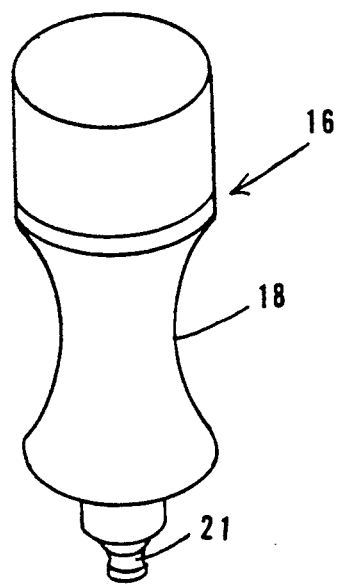
FIG. 2 is a perspective view of one type of conventional universal joint having a threaded stud means for connecting the universal joint to the sailing board.
Figure 3:
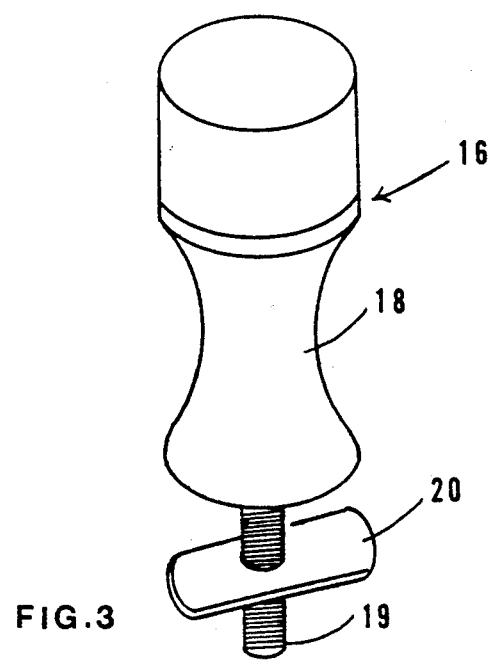
FIG. 3 is a perspective view of another type of conventional universal joint having the clip-type stud means for connecting the universal joint to the sailing board.

Referring now to the drawings, there is shown in FIG. 1 a conventional windsurfer rig 10 connected to the training aid and support device 12 of the present invention. As is well known, a conventional windsurfer rig 10 comprises a mast 11, a boom 14, and a sail 15. At the lower end of the mast 11 there is provided a mast-step 16 which includes a universal joint 18. Two widely used types of conventional universal joints are shown in more detail in FIGS. 2 and 3. As shown, the universal joint 18 terminates in a mounting stud for connecting the universal joint 18 to the sailing board. In FIG. 2 the universal joint 18 terminates in a threaded type of mounting stud 19 which is adapted to be secured to the board by a nut 20. In FIG. 3 the universal joint 18 terminates in a clip-type mounting stud 21 and is adapted to be secured to the board by a sutiable clip (not shown). In FIG. 1 the windsurfer rig 10 is shown secured to the training aid and support device 12 of the present invention so that the windsurfer rig 10 is suitably supported in a manner which prevents damage to the universal joint 18 and allows the user to move the rig through all of the pivoting and other movements desired while the user is standing safely on the ground.

In accordance with the present invention, therefore, it is not necessary for the user to stand upon a movable platform with the potential for injury in order to be able to manipulate the windsurfer rig and learn and practice all of the required or desired windsurfer rig movements. Since during actual sailing steering and control of the sailing board is accomplished by the proper pivoting and other movements of the rig, the present invention provides for achieving almost all of the desired benefits in a very simple windsurfer rig training aid and stable rig support device which avoids the deficiencies of prior art simulators, and which is safe, inexpensive, and easily carried by the user with the other usual sailing gear.

Figure 4:
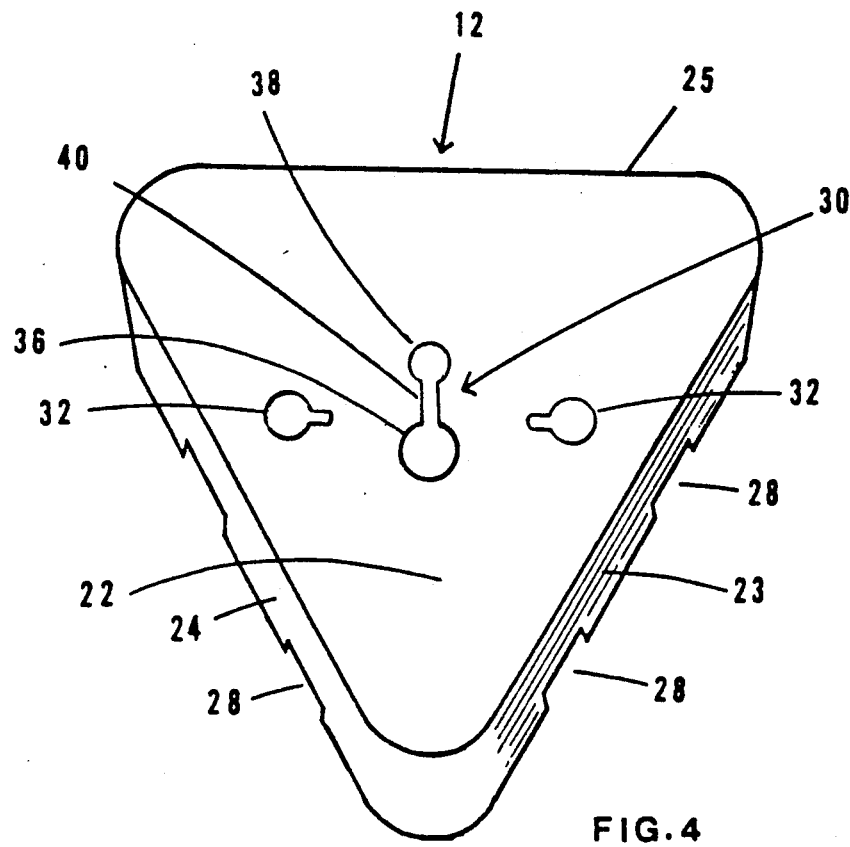
FIG. 4 is a perspective view of the windsurfer rig training aid and support device in accordance with one preferred embodiment of the invention.

A preferred embodiment of the windsurfer training aid and rig support device of the present invention is shown in more detail in FIG. 4. As shown, the training aid and rig support device 12 comprises a base member in the form of an inverted, shallow, triangular receptical which is defined by a top planar surface 22 and three side rails 23, 24, and 25. The side rails 23, 24, and 25 depend from the underside of the top planar surface 22 and are adapted to support the base member from a horizontal supporting surface, such as the ground. Each of the side rails 23, 24, and 25 may be provided with a plurality of spaced-apart cut-out slots 28 to limit lateral movement of the planar surface 22. If desired, instead of having a plurality of spaced-apart slots, a single longer slot may be provided in each of the side rails 23, 24, and 25.

Figure 5:
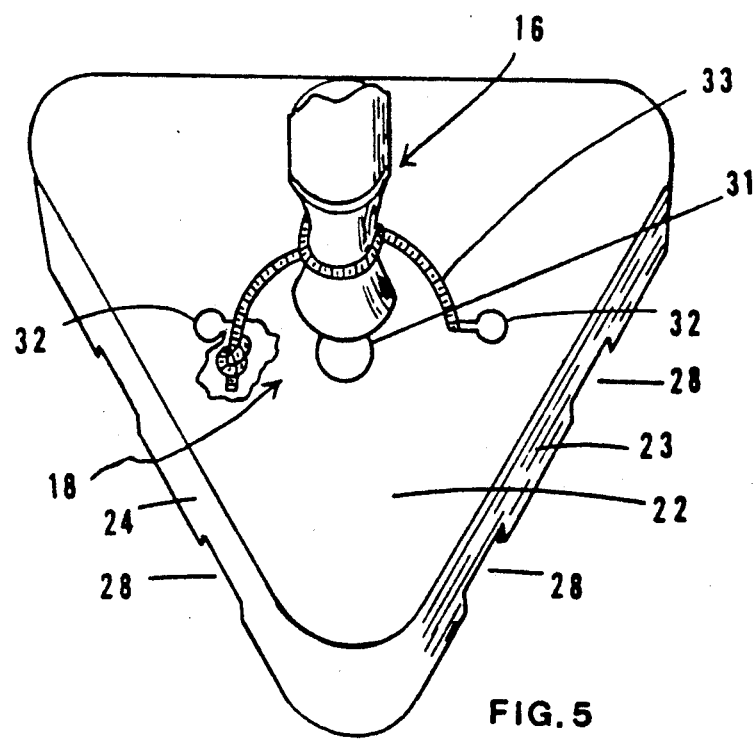
FIG. 5 is a perspective view of another embodiment of the invention illustrating one form of a universal type of rig-mast receiving means.

The top planar surface 22 is provided with a suitable rig-mast receiving means 30 which is arranged and constructed to receive and support the lower end of the rig-mast. Conveniently, the rig-mast receiving means may be a simple opening 31 of an appropriate size adapted to receive the mounting stud of the particular universal joint. Alternatively, as will be described in more detail later, the rig-mast receiving means 30 may be of a "universal type" comprising two spaced-apart openings 36 and 38 interconnected by an open slot 40, a suitable insert means, or any other suitable structure or arrangement for receiving and supporting the rig-mast from the supporting base. The top planar surface 22 is also provided with suitable openings, shown as keyhole shaped openings 32 and 32', disposed on opposite sides of the opening 31. The openings 32 and 32' may be used to secure the ends of a mast arrester means for securing the rig-mast to the base member. Conveniently, such mast arrester means may be a strap or other suitable retaining means, but is preferably a stertchable or elastic type cord ("shock-cord") 33. In operation the elastic cord 33 is streched and wraped around the base of the universal joint 18 and suitable anchor means, such as the knotted ends of the cord 33, are secured by the keyhole openings 32 and 32' as shown more particularly in FIG. 5.

Figure 6:
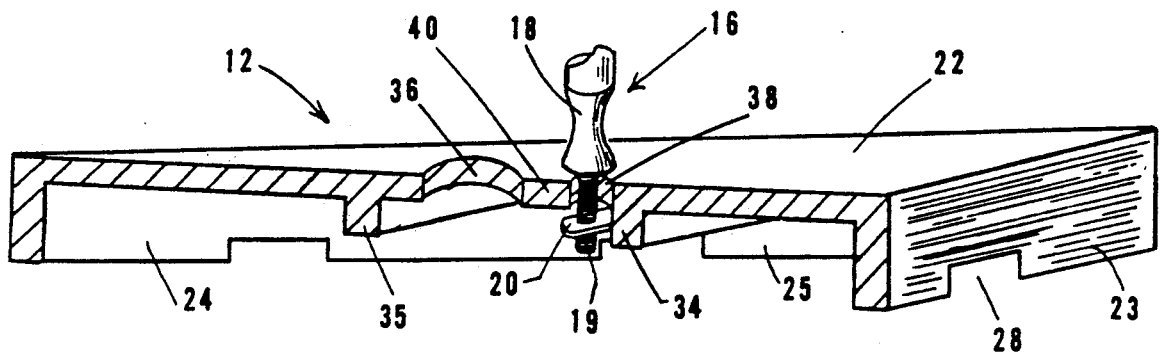
FIG. 6 is a partially sectioned perspective view of the device of FIG. 4.

As shown in more detail in FIG. 6, the top planar surface 22 may be suitably reinforced. This may be conveniently provided by lateral reinforcing rib supports 34 and 35 which depend from the underside of the planar surface 22. The reinforcing rib 34 is disposed adjacent the rig-mast receiving opening 38 and functions also as a retaining means for the nut 20 when, for example, a threaded type of universal joint is involved. The reinforcing rib 35 may be disposed parallel with the rib 34 and spaced a preselected distance therefrom. To increase the overall rigidity, each of the corners of the triangular base member are also suitably reinforced.

The device 12 may be made of metal, wood, or any other suitable material. Preferably, the entire base member 12 is constructed of a rigid plastic, and may be molded in one piece by using well known molding techniques.

Figure 7:
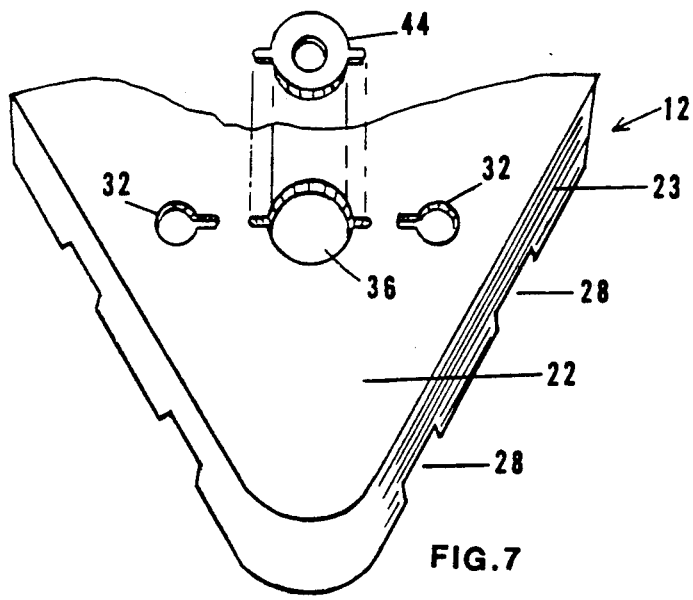
FIG. 7 is an exploded view illustrating another form of universal type of rig-mast receiving means.

As previously described, the top planar surface 22 is provided with a suitable rig-mast receiving means 30, which may be any suitable structure, or an opening 31 of an appropriate size adapted to receive the mounting stud of the particular universal joint 18 in a manner which simulates the usual attachment to the sailing board. Alternatively, the top planar surface 22 may be provided with a generalized or "universal type" of rig-mast receiving means. That is, a rig-mast receiving means which is adapted or adaptable to receive various sizes or types of universal joint mounting studs. One form of such universal type of mast receiving means is in the form of the unsymmertical dumbell shaped opening shown in FIGS. 4 and 6. Another form of universal type of rig-mast receiving means is shown in FIG. 7 and includes an adaptor insert, wherein the large mast receiving opening 36 is adapted to receive an insert 44 which has a smaller opening to receive a smaller diameter rig-mast mounting stud. This allows for the selective use of a plurality of inserts 44, each adapted to be received within the larger opening 36 and each such insert having an opening of a desired smaller diameter so as to receive rig-mast mounting studs of different sizes. Yet another form of universal rig-mast supporting means in the form of a double-dumbell opening is shown in FIG. 8 and will be described in more detail in connection with that Figure.

Although there has been no standard size of universal joint mounting agreed upon by the various manufactures of universal joints for windsurfer rig-masts, we have found that the majority of the mounting studs in present use fall within a reasonable range of diameters. In order to be capable of receiving these various types, sizes, and styles of universal joints, the rig-mast receiving means 30 may be provided in the form of an opening having an unsymmetrical dumbell shape, as shown in FIGS. 4 and 6. The universal type of rig-mast receiving means 30 shown in FIGS. 4 and 6 has spaced-apart openings 36 and 38 of different diameters interconnected by an open slot 40. The center of the open slot 40 is arranged to be at, or near, the geometric center of the triangular base member so that regardless of which of the openings 36 or 38 the rig-mast 10 is disposed in, it will be mounted and supported near the geometric center of the triangular base member. As shown, the opening 36 is of a larger diameter than the opening 38 and is adapted for receiving the larger sizes of widely used clip-type universal joint mounting studs. The smaller opening 38 is adapted for receiving the smaller diameter, threaded-type of universal joint mounting studs. The interconnecting slot 40 allows for easy connection of the universal joint mounting stud to the appropriate size opening in the top planar surface 22. For example, the universal joint mounting stud may be initially positioned into the larger opening 36 and if the opening 36 is of the appropriate size, the stud can then be secured into that opening in the top planar surface 22 of the base member. If the universal joint mounting stud means is of the threaded type which is usually the smaller diameter such as shown in FIG. 2, the mounting stud is moved through the slot 40 to the smaller opening 38 and suitably secured to the top planar surface 22 by the nut 20, similar to the manner in which such universal joint mounting stud would be secured to the sail board. As previously described, the lateral reinforcing rib 34 would be disposed adjacent the smaller diameter opening 38 so that it may function as a retainer for the nut 20 which secures the threaded mounting stud to the top planar surface 22. The nut 20 can be tightened against the underside of the planar surface 22 by rotating the step-mast and universal joint assembly in the same manner as such assembly would be tightened to the sail board.

If the universal joint mounting stud means is of the clip-type, which is usually of a larger diameter than the threaded type such as shown in FIG. 3, the universal joint mounting stud would be disposed and secured in the larger opening 36 as shown more particularly in FIG. 4. We have found that it is not necessary to use the securing clip normally used to secure the clip-type stud to the sail board, and the universal joint may be secured to the top planar surface 22 by means of the stretchable cord 33, or other suitable restraining means, as previously described.

Figure 8:
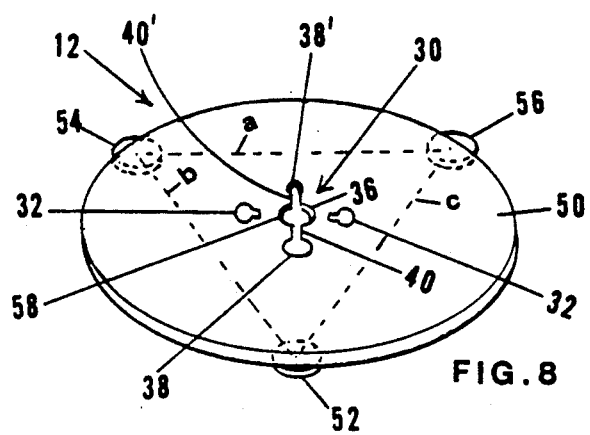
FIG. 8 is a perspective view of a windsurfer rig training aid and support device in accordance with another embodiment of the invention employing a planar deck member supported by a plurality of support pads connected to the underside of the deck member and arranged in a triangular configuration.

In FIG. 8 there is shown a windsurfer rig training aid and support device in accordance with another embodiment of the invention. As shown, the device 12 comprises a planar deck member 50, and a plurality of supporting pads 52, 54, and 56 which are secured to the undersurface of the deck member 50 for securely and stably supporting the deck member from and a preselected small distance above a supporting surface, such as the ground. The deck member 50 is provided with a suitable rig-mast receiving means 30. In the embodiment illustrated in FIG. 8, the rig-mast receiving means 30 is in the form of a "double-dumbell" opening 58, the centerline of which is near the geometric center of the configuration defined by the arrangement of the supporting pads 52 through 56. The double-dumbell opening 58 provides for a universal-type of rig-mast receiving means and is similar to that described in connection with FIGS. 4 and 6 in that it comprises a large diameter opening 36 with different, smaller diameter openings 38 and 38' at opposite ends thereof. The smaller diameter openings 38 and 38' are connected to the large opening 36 by the open slots 40 and 40'

The supporting pads 52, 54, and 56 are arranged in a triangular configuration wherein the centers of the pads define a triangle, preferably an equilateral triangle, as indicated by the broken lines a, b, and c. With the triangular arrangement of the supporting pads so that an acutely-angled vertex can be positioned down-wind, and the disposition of the rig-mast receiving means 30 near the geometric center thereof, the devvice is stably supported from the supporting surface and the force generated by the rig during operation is distributed substantially equally among the supporting pads 52, 54, and 56. The deck member is illustrated as being circular, however, such deck member may have any other convenient configuration so long as the supporting means, such as pads or legs are arranged in a generally triangular configuration and so that in operation one acutely-angled vertex can be positioned down-wind. A device and/or a deck member having a triangular configuration generally corresponding to the arrangement of the supporting pads is preferred as previously described.

One particulat windsurfer rig training aid and support device constructed in accordance with the teachings of the present invention was in the form of an equilateral triangle having side rails (23, 24, 25) 37.5 centimeters long by 4 centimeters wide.

The foregoing preferred embodiments have been described in detail herein. It will be understood, however, that persons skilled in the art to which the invention pertains, or to which it is most nearly connected, will now be in a position to arrive at various modifications without departing from the true spirit, disclosure, and concept of the invention. For example, instead of using openings to provide the rig-mast receiving means, various different forms of structures may be used. For instance, a mast-step and universal joint assembly, or a universal joint adaptor may be arranged as part of the base member and the rig-mast would then be removably coupled to such mast-step assembly or adaptor.

The invention is not to be restricted to a specific shape of deck member or top planar surface so long as there is provided protection for and easy connection of the universal joint to the device, and a suitable base member supporting means arranged to raise the deck member or top planar surface a small distance above the supporting surface, such as the ground, and so that such supporting means stably supports the deck or top planar surface against sliding and resists tilting or other movement from the wind during use. While the foregoing described triangular configurations are preferred, acceptable results can be achieved by a supporting means arranged to stably support the base member from and a selected small distance above a supporting surface, and which supporting means includes at least one acutely-angled vertex which can be disposed down-wind during use of the training aid and support device of the invention.

The terms and expressions which have been employed herein are used as terms of description and not of limitation, and there is no intention in the use of such terms and expressions of excluding any equivalents of the features shown or described. It is recognized that various modifications are possible and will readily occur to those of ordinary skill in the art. The appended claims are intended to cover all such modifications and equivalents as fall within their true spirit and scope.

What is claimed is:

1. For use with a windsurfer rig including a mast which terminates at one end in a mounting means, a boom connected with said mast, and a sail, a teaching aid and windsurfer rig support device for teaching an individual to manipulate the windsurfer rig comprising:
a stationary base member for supporting the windsurfer rig, said base member being in the form of a shallow inverted receptacle defined by a top planar surface and depending side walls, said depending side walls are arranged and constructed to form a supporting means so that when the bottom edges of said depending side walls are disposed on a supporting surface said base member is securely, non-rotatably and non-pivotally supported from said supporting surface, said top planar surface having a receiving means for receiving the mounting means of the mast, the vertical center line of said receiving means being near the geometric center of said base member, and means for securing said mounting means to said base member, whereby said windsurfer rig is supported from said stationary base member and can be maneuvered in the absence of the individual being mounted on said stationary base member.

2. The device recited in claim 1 wherein the depending side walls of said receptacle form said supporting means having a generally triangular configuration 3. The device recited in claim 2 wherein the lower edge of each of said depending side walls has at least one longitudinally extending cutout slot.

4. The device recited in claim 2 wherein said receiving means is in the form of an opening in said top planar surface arranged and constructed to receive said mounting means.

5. The device recited in claim 2 wherein said receiving means comprises at least two openings having different diameters interconnected by an open slot and wherein the center of said open slot is near said geometric center of said base member.

6. The device recited in claim 2 wherein said mast terminates at one end in a universal joint having an extending threaded mounting stud and said means for securing said mounting means to said base member comprises a nut threaded onto said mounting stud for securing said mounting stud to said base member.

7. The device recited in claim 2 wherein said means for securing said mounting means to said base member comprises a stretchable cord having anchor means at each end thereof which are arranged and constructed to be removably secured to said base member.

8. The device recited in claim 7 wherein said top planar surface includes openings disposed on opposite sides of said receiving means and said openings are adapted to receive said anchor means of said stretchable cord.

9. The device recited in claim 1 wherein said receiving means is in the form of an opening in said top planar surface arranged and constructed to receive said mounting means.

10. The device recited in claim 1 wherein said receiving means comprises at least two openings having different diameters interconnected by an open slot and wherein the center of said open slot is near said geometric center of said base member.

11. The device recited in claim 1 wherein said mast terminates at one end in a universal joint having a threaded mounting stud extending therefrom and wherein said means for securing said mounting means to said base member comprises a nut threaded onto said mounting stud for securing said mounting stud to said base member.

12. The device recited in claim 1 wherein said means for securing said mounting means to said base member comprises a stretchable cord having anchor means at each end thereof which are arranged and constructed to be removably secured to said base member.

13. The device recited in claim 12 wherein said top planar surface includes openings disposed on opposite sides of said receiving means adapted to receive the anchor means of said stretchable cord.

14. The device recited in claim 1 wherein said supporting means has at least one acutely angled vertex.

15. For use with a windsurfer rig having a mast which terminates at one end in a mounting means, a boom connected with said mast, and a sail, a teaching aid and windsurfer rig support device for teaching an individual to manipulate the windsurfer rig comprising:
a stationary planar member having at the top surface thereof a receiving means for receiving the mounting means of the mast for supporting the windsurfer rig from said stationary planar member;

supporting means fixedly connected with and depending from the underside of said planar member arranged and constructed for securely, non-rotatably and non-pivotally supporting said stationary planar member from a supporting surface, said support means being further arranged and constructed so that the geometric center thereof is near the vertical center line of said receiving means; and means for securing the mounting means to said stationary planar member, whereby said windsurfer rig is disposed on said stationary planar member with all of the degrees of freedom said windsurfer rig would have when connected to a windsurfer sailboard during actual sailing but with said stationary planar member being safely, securely, non-rotatably and non-pivotally supported from the supporting surface by said support means so that the individual in the absence of being mounted on said stationary planar member can be taught and safely practice the windsurfer rig maneuvers and skills associated with actual windsurfer sailboard sailing while safely stand on said supporting surface.

16. The device recited in claim 15 wherein said support mean comprises a plurality of spaced apart support pads arranged in a generally triangular configuration.

17. The device recited in claim 15 wherein said support means comprises a plurality of rails forming a shallow hollow frame of generally triangular configuration.

18. The device recited in claim 15 wherein said receiving means comprises an opening in the top surface of said stationary planar member.

19. The device recited in claim 15 wherein said receiving means comprises spaced-apart openings of different diameters interconnected by an open slot and wherein the center of said slot is near the geometric center of said support means.

20. A training aid and support device for teaching an individual to manipulate a windsurfer rig, wherein said windsurfer rig includes a mast terminating at one end in a mounting means, a boom connected with said mast, and a sail comprising:
  a shallow and inverted receptacle hollow triangular shaped base member being defined by a top planar member and three said rails depending therefrom for non-rotatably and non-pivotally supporting said planar member from a supporting surface;
  a receiving means for receiving the mounting means of said mast disposed on the top surface of said top planar member, the vertical center line of said receiving means being near the geometric center of said base member and arranged and constructed to receive said mounting means and provide support for said windsurfer rig; and
  means for securing said mounting means to said base member, whereby said windsurfer rig is supported from said base member and so that the individual can be taught and safely practice the windsurfer rig maneuvers and skills associated with actual windsurfer board sailing in the absence of the individual being mounted on said base member but rather while said individual is safely standing on said supporting surface.

21. The device recited in claim 20 wherein said side rails form an equilateral triangle.

22. The device recited in claim 20 wherein said side rails are integral with said top planar member.

23. The device recited in claim 22 wherein the lower edge of each of said depending side rails has at least one longitudinally extending cutout slot.

24. A windsurfer training device for teaching an individual to manipulate a windsurfer rig comprising:
  a base member including a top planar member having means thereon for receiving one end of a sail mast of the windsurfer rig, and support means connected with and depending from said top planar member for spacedly, non-rotatably and non-pivotally supporting said top planar member from a supporting surface, whereby the individual can maneuver said windsurfer rig in the absence of said individual being mounted on said base member of said windsurfer training device.

25. The windsurfer training device recited in claim 24 wherein said support means is arranged and constructed to define at least one acute-angled vertex.

26. The windsurfer training device recited in claim 24 wherein said support means includes a plurality of pads arranged in a generally triangular configuration.

27. The windsurfer training device recited in claim 26 wherein said means for receiving the one end of said the sail mast comprises at least two openings having different diameters interconnected by an open slot and wherein the center line of said slot is near the geometric center of said base member.

28. The windsurfer training device recited in claim 27 further comprising mast receiving means for securing said sail mast to said base member, said mast arrester means including a stretchable cord connectable near the one end of said sail mast of said windsurfer rig and arranged and constructed to be secured to said base member.

29. The windsurfer training device recited in claim 24 wherein said support means includes a plurality of depending side rails arranged and constructed to form a triangular shaped frame.

30. The windsurfer training device recited in claim 24 wherein said top planar member and said support means is a single integral unit.

31. The windsurfer training device recited in claim 24 further comprising mast receiving means connectable near the one end of said sail mast of said windsurfer rig and also connectable with said base member for securing said windsurfer rig to said base member.

32. The windsurfer training device recited in claim 31 wherein said mast receiving means comprises a stretchable cord connectable near the one end of the sail mast of said windsurfer rig and arranged and constructed to be secured to said base member.

33. The windsurfer training device recited in claim 31 wherein said mast receiving means comprises a stretchable cord arranged and constructed to have an intermediate portion of said stretchable cord wrapped around said one end of the sail mast of said windsurfer rig and having one end of said stretchable cord arranged to be secured to said base member at a location laterally displaced from one side of said means for receiving said one end of the sail mast of said windsurfer rig and the other end of said stretchable cord arranged to be secured to said base member at a location laterally displaced from another side of said means for receiving said one end of the sail mast of said windsurfer rig.

34. The windsurfer training device recited in claim 24 wherein said means for receiving one end of the sail mast comprises an opening in said top planar member.

35. The windsurfer training device recited in claim 24 wherein said means for receiving one end of the sail mast comprises two openings having different diameters interconnected by an open slot and wherein the center line of said open slot is near the geometric center of said base member.

* * * * *